United States Patent [19]

Takagi et al.

[11] 4,034,847

[45] July 12, 1977

[54] GRANULAR MATTER FEEDING METHOD AND APPARATUS THEREFOR

[75] Inventors: Haruyuki Takagi, Fujisawa; Hisakuni Yamashita, Chigasaki; Korenobu Yufu, Hiratsuka, all of Japan

[73] Assignee: The Yokohama Rubber Co. Ltd., Japan

[21] Appl. No.: 581,497

[22] Filed: May 28, 1975

[30] Foreign Application Priority Data

July 13, 1974 Japan ............................. 49-79753
July 18, 1974 Japan ............................. 49-81777

[51] Int. Cl.² ..................................... B65G 69/14
[52] U.S. Cl. ............................. 198/505; 198/347; 198/585; 241/101 B; 259/185
[58] Field of Search ............... 198/39, 40, 44, 54, 198/56–58, 93, 96, 161, 167, 183, 101, 504, 505, 601, 347, 585; 241/34, 81, DIG. 31, 101 B; 259/185

[56] References Cited

U.S. PATENT DOCUMENTS

| | | | |
|---|---|---|---|
| 1,435,616 | 11/1922 | Mosher | 198/56 X |
| 1,743,728 | 1/1930 | Pangborn | 198/183 |
| 1,758,557 | 5/1930 | Bullock | 198/167 |
| 1,843,281 | 2/1932 | Hoodless | 198/167 X |
| 1,984,980 | 12/1934 | Müller | 198/96 UX |
| 3,073,402 | 1/1963 | Green et al. | 198/39 X |
| 3,117,080 | 1/1964 | Krestin et al. | 241/34 X |
| 3,421,703 | 1/1969 | Galer | 241/34 X |
| 3,530,973 | 9/1970 | Rossi | 198/96 |
| 3,780,849 | 12/1973 | Hoehl et al. | 198/44 X |
| 3,794,049 | 2/1974 | Wochnowski | 198/39 X |

Primary Examiner—Evon C. Blunk
Assistant Examiner—Richard K. Thomson
Attorney, Agent, or Firm—Kane, Dalsimer, Kane, Sullivan and Kurucz

[57] ABSTRACT

A granular matter feeding method and an apparatus, in which unvulcanized rubber blocks of a non-fixed shape are crushed by a crusher into granules, the weight of said granules being measured, batches of said granules being fed onto a plurality of storages conveyors according to kind, said conveyors feeding in turn to a plurality of metering hoppers which selectively deliver measured amounts of the granules to a conveyor for transporting to a kneader. This system permits the mixing of precise amounts of various types or sizes of rubber granules.

9 Claims, 3 Drawing Figures

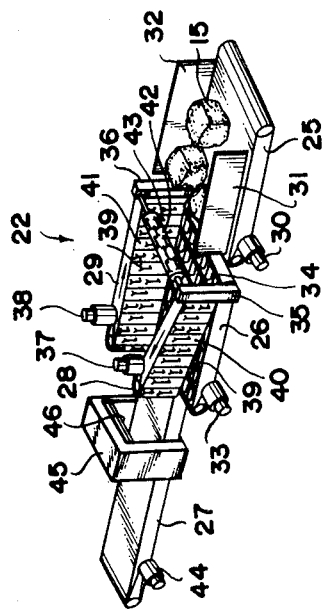
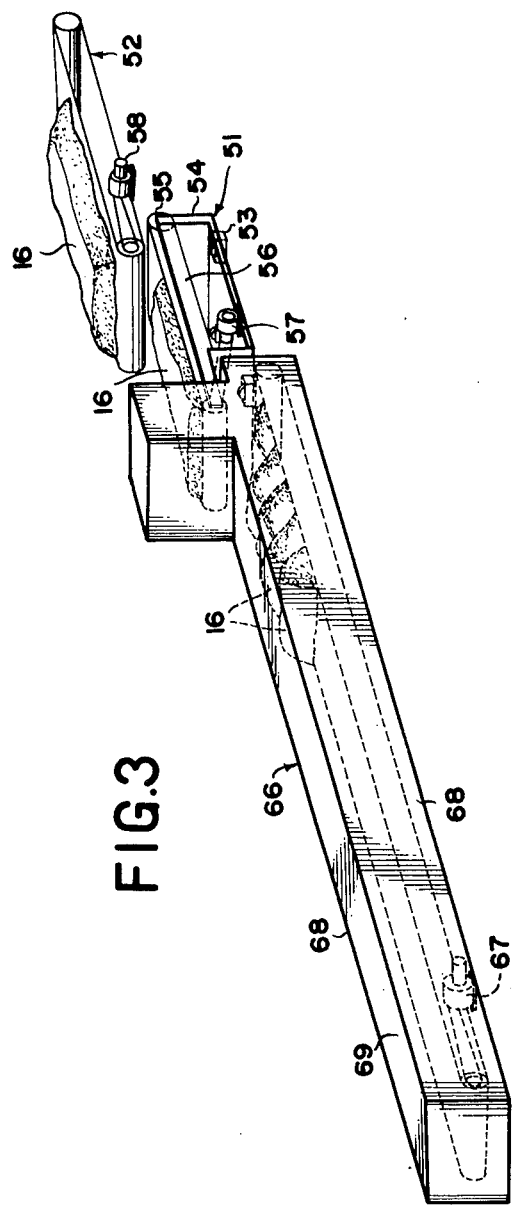

GRANULAR MATTER FEEDING METHOD AND APPARATUS THEREFOR

BACKGROUND OF THE INVENTION

1. Field of the Invention

This invention relates to a method and an apparatus for feeding to a kneader a given amount of starting rubber materials consisting of natural and synthetic rubbers, together with various kinds of ingredients, and more particularly to a method and an apparatus for crushing starting rubber materials of a block form storing, metering and then charging same into a kneader.

2. Description of the Prior Art

Hitherto, the feeding of starting rubber materials into a kneader has been performed by manual operations. More specifically, in such operations, various kinds of rubber blocks to be kneaded are manually cut to desired sizes, respectively, after which the starting rubber materials thus cut are charged into a kneader by means of conveyors. Such a prior art using the aforesaid manual operations including metering and cutting imposes a heavy burden on operators, with the accompanied poor operational efficiency and metering accuracy.

For charging natural rubber and synthetic rubber of a block form into a kneader, rubber blocks placed on a pallet are cut to desired sizes for the metering purpose, and then the cut pieces thus prepared are fed to the kneader. However, an attempt to mechanically automate such a series of manual operations is confronted by various kinds of difficulties, because of properties, dimensions and shapes of rubber blocks and the like.

Principally, difficulties are confronted when feeding a given amount of natural rubber to a kneader and a cutter, because of non-uniformity in size, of natural rubber blocks, i.e., the troubles in feeding the rubber blocks to a cutter or clogging in the charging port of the cutter, making the automation of such operations difficult.

In contrast thereto, since synthetic rubber blocks available in the market are smaller or lighter in weight than natural rubber blocks, and since the synthetic rubber blocks are likely to be formed to a fixed shape and may be loaded on a pallet in an orderly manner, the synthetic rubber blocks may be adsorbed by a vacuum device or picked up by a metal tool having a spear-like tip by piercing same into the rubber blocks. Apparently, such operations are of poor efficiency, and to make the matter worse, such operations are confronted with another difficulty because of the tackiness of the unvulcanized rubber, resulting in the failure to provide efficient and positive operations.

On the other hand, an attempt to transport rubber granules from a crusher to a metering station by means of a conveyor for metering same leads to losses in time and power, because rubber granules are fed from a crusher in a non-continuous manner or intermittently, so that the conveyors are temporarily idle, during which time the metering device is in operation, resulting in an inefficient operation. As can be seen from this, such an intermittent transportation poses difficulties in automating the transportation of the rubber granules as well as the steps succeeding thereto.

Accordingly, it has been long desired to develop an automated feeding system, in which unvulcanized rubber blocks of a non-fixed shape are fed to a crusher in an orderly manner and the rubber granules thus prepared are metered to a given amount, followed by feeding of a given amount of rubber granules into a kneader.

It is a principal object of the invention to provide a method for crushing unvulcanized rubber blocks of a non-fixed shape, metering and feeding same to a kneader efficiently.

It is another object of the invention to provide a novel method and an apparatus for crushing several kinds of unvulcanized rubber blocks of a non-fixed shape, metering the aforesaid several kinds of rubber granules, respectively, and feeding same to a kneader.

It is a further object of the invention to provide an apparatus which avoids the manual operations including the steps of feeding unvulcanized rubber blocks of a non-fixed shape to a crusher and charging the rubber granules thus obtained into a kneader, i.e., handling, metering and charging operations, thereby providing continuous and automated operations.

It is a still further object of the invention to provide a method and an apparatus, in which upon charging of unvulcanized rubber blocks of a non-fixed shape into a crusher, the rubber blocks being transported are arranged on a line, thereby enhancing the efficiency and positiveness of the succeeding processing or operations.

It is a yet further object of the invention to provide a method and an apparatus, in which for enabling a continuous processing of crushed rubber granules, a given amount of metered rubber granules are intermittently fed on to a storage conveyor which in turn advances a given distance after receiving a given amount of rubber granules, followed by continuous transfer of rubber granules to another conveyor according to inching, thus enabling the delivery of the rubber granules to the subsequent step.

SUMMARY OF THE INVENTION

According to the present invention, there is provided a method for feeding a given amount of rubber granules to a kneader, which comprises the steps of transporting unvulcanized rubber blocks of a non-fixed shape to a crusher in orderly arrangement, crushing same, metering a given amount of rubber granules thus obtained, storing the thus metered rubber granules as per a given amount, and feeding the rubber granules thus stored to a kneader.

According to the present invention, there is provided an apparatus for feeding a given amount of rubber granules to a kneader, which comprises a crusher adapted to crush unvulcanized rubber blocks of a non-fixed shape into granules, a first conveyor means for transporting said unvulcanized rubber blocks to said crusher, a second conveyor means for metering rubber granules obtained from said crusher and transporting same, and a third conveyor means for transporting rubber granules, which have been metered in said second conveyor means, to a kneader per a given amount.

According to the method and apparatus of the present invention for use in feeding a given amount of rubber granules to a kneader, unvulcanized blocks of a non-fixed shape may be transported to a crusher in an orderly manner, and in addition a series of steps including metering the rubber granules obtained from the crusher, storing same as per a given amount and feeding a desired amount of rubber granules to a kneader may be efficiently automated, thus presenting excellent efficacy.

BRIEF DESCRIPTION OF THE DRAWING

FIG. 2 is a perspective view showing another embodiment of a conveyor system included in the apparatus shown in FIG. 1; and FIG. 3 is a perspective view showing a second conveyor system which is a part of the apparatus according to the invention, and a modification of a storage conveyor of the invention.

DESCRIPTION OF THE PREFERRED EMBODIMENTS

Figure 1:
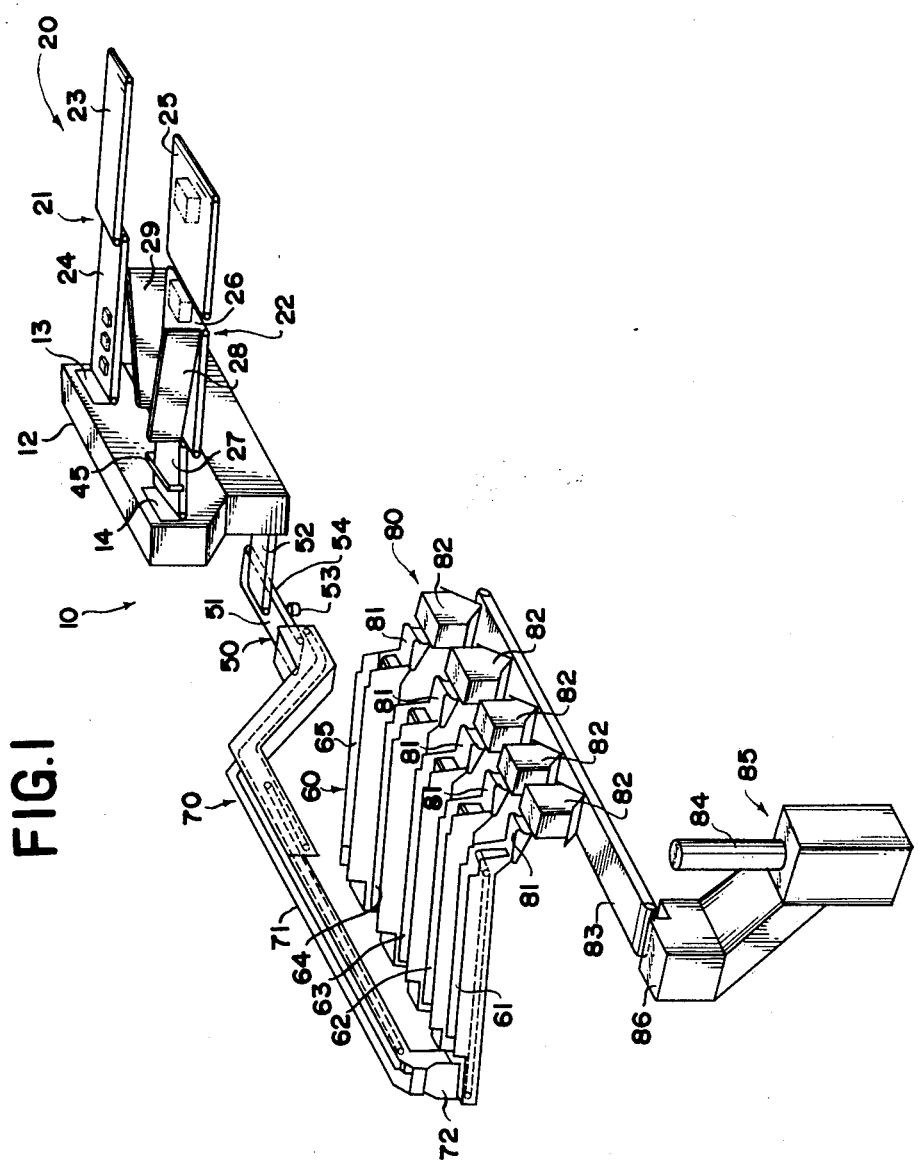
FIG. 1 is a perspective view of the outline of the apparatus of the invention, which feeds a given amount of rubber granules to a kneader.

Referring now to FIG. 1, there is generally shown at 10 an apparatus of the invention, which feeds a given amount of rubber granules to a kneader. The apparatus 10 or feeding apparatus includes a crusher 12, a first conveyor system 20 adapted to transport the starting rubber blocks to the crusher, and a second conveyor system 50 adapted to deliver from the crusher the rubber granules which have been obtained from the crusher 12 by crushing rubber blocks.

The first conveyor system 20 includes two conveyor groups 21, 22, one of the conveyor groups 21 consists of two belt conveyors 23, 24 adapted to transport synthetic rubber blocks of a relatively small size, the end of the conveyor 24 engaging a hopper opening 13 of the crusher 12. The other conveyor group 22 consists of continuously arranged three conveyors 25, 26, 27 adapted to transport natural rubber blocks of a relatively large size, as shown in the embodiment, one end of the conveyor 27 engaging a hopper opening 14 of the crusher 12.

The conveyor groups 21, 22 receive the synthetic and natural rubber blocks from pallets on the respective outermost belt conveyors 23, 25, thereby allowing the continuous transportation of rubber blocks via hopper openings 13, 14 into crusher 12 by means of the respective conveyors.

Provided on the opposite sides of the center conveyor 26 in the conveyor group 22 are a pair of side conveyors 28, 29 adapted for orderly transportation of the natural rubber blocks. The side conveyors include flat endless belts, thereby arranging in an orderly manner the natural rubber blocks which are being transported on the conveyors 25, 26, while preventing the dwelling of the rubber blocks due to their abutting on the peripheral edge of the hopper opening. The conveyors 25, 26, 27 are so arranged as to provide the same transportating direction. As can be seen, the transporting conveyor 25 serves to feed the natural rubber blocks 15 on to the arranging conveyor 26, while the conveyor 27 serves to deliver the rubber blocks 15 from the arranging conveyor 26.

As has been described, the conveyor group 22 constitutes a system adapted to arrange and transport the natural rubber blocks. FIG. 2 shows another embodiment of the arranging and transporting system according to the present invention. In this embodiment, like reference numerals designate like parts throughout FIGS. 1 and 2.

Referring to FIG. 2, the arranging and transporting apparatus is provided with the feed-in conveyor 25, arranging conveyor 26 and delivery conveyor 27, all of which are so designed as to provide the same transporting direction, as in the case shown in FIG. 1.

The feed-in conveyor 25 is a belt conveyor which is driven by means of a motor 30 and equipped with a pair of upright fenses 31, 32 on the opposite sides of the conveyor 25 for preventing those natural rubber blocks spilling from the conveyor 25, which have been dropped off the pallets carried on a transporting vehicle such as a fork lift.

The arranging conveyor 26 is a slat conveyor driven by means of a motor 33 and provided with a plurality of non-driver rollers 34 having a plurality of rotary shafts which are directed in the same transporting direction. A pair of side conveyors 28, 29 are each supported by poles 35, 36 secured to the opposite side portions of the arranging conveyor 26, being so designed that the distance between the side conveyors is gradually narrowed, as it goes from the feed-in end of the arranging conveyor to the delivery end thereof, i.e., the side conveyors from an angle to the transporting direction of the arranging conveyor 26.

The side conveyors 28, 29 are belt conveyors adapted to be driven by means of motors 37, 38, respectively. The endless belts 40, 41 having projections 39 on their surfaces are both rotated in the same direction, so that the inner side surfaces of the belts 40, 41 may move in the opposite direction to each other. In the embodiment as shown, the endless belts 40, 41 are both rotated in the counterclockwise direction, as shown by arrows. The projections 39 provided on the endless belts 40, 41 serve to roughen the surfaces of the belts to thereby provide a great frictional force between natural rubber blocks 15 and the belts, when the belts contact the rubber blocks 15 fed on to the arranging belt. In this respect, the projections may assume a form of a pawl, or otherwise the surfaces of the belts may be roughened by providing concave portions in the belt surfaces. Alternatively, the side conveyors may be replaced by slat conveyors equipped with a plurality of drive rollers having projections on their surfaces.

With another embodiment of the arranging and transporting apparatus as shown in FIG. 2, there is provided a roll 42 on top of the poles 35, 36 which are secured to the opposite side portions of the arranging conveyor, the roll 42 being supported by the poles 35, 36 in a transverse direction of the arranging conveyor 26 and rotated forcibly in the same direction as that of belt carrying rolls of the conveyor 25 by means of a drive source (not shown). The roll 42 is equipped with a plurality of pawls 43 on its circumferential surface. In case the natural rubber blocks are placed one on top of another after dropping off the pallets on the transporting conveyor 25, the roll 42 will engage the top natural rubber blocks to thereby scrape same off, before the rubber blocks are transported on to the arranging conveyor 26. For this reason, it is recommendable that the scraping roll 42 be so supported by the poles 35, 36 as to move up and down commensurate to the dimensions of natural rubber blocks. It is also recommended that the side conveyors be supported by the poles 35, 36 in a manner that the minimum spacing between the side conveyors 28, 29 may be varied commensurate to the size of the natural rubber blocks. In general, the natural rubber blocks are larger in size than the synthetic rubber blocks, so that by adjusting the height of the scraping roll 42 and the minimum spacing between the side conveyors 28, 29, there may be achieved the delivery of the respective natural rubber blocks, i.e., the orderly transportation of the rubber blocks, with the aid of the arranging conveyor 26.

The delivery conveyor 27 is a belt conveyor driven by means of a motor 44, and provided with a gate-shaped frame 45, to which is secured a metal-detector 46. In case a metal piece is contained in the natural rubber blocks 15 delivered from the arranging conveyor 26, the metal piece may be detected by the metal detector 46, when the natural rubber block passes through the gate-shaped frame 45. Then, the operation of the conveyor group 22 is temporarily stopped, and the natural rubber block containing the metal piece thus detected is removed from the delivery conveyor 27, because such metal piece injures the blades of the crusher. The natural rubber blocks, after the metal pieces have been removed, are again returned on to the conveyor 27 or the conveyor 25.

The starting rubber granules are obtained by crushing the rubber blocks to sizes of 50 to 1000 g by the crusher 12 and are fed on to a second conveyor system 50. The second conveyor system includes a scale conveyor 51 and delivery conveyor 52 which is adapted to transport granules 16 from the crusher 12 onto the scale conveyor.

FIG. 3 is similar to FIG. 1 except that the positional relationship of the respective conveyors in the second conveyor system 50 is different from that shown in FIG. 1. FIG. 3 shows another embodiment of the storage conveyor of FIG. 1, which will be described hereinafter. The construction of the second conveyor system will be described with reference to FIG. 3, since the second conveyor system of FIG. 3 is similar to that shown in FIG. 1 except that the transporting direction of the delivery conveyor 52 is the same as that of the scale conveyor 51.

The scale conveyor 51 consists of a belt conveyor 56 including a pulley 55 which is supported through the medium of a frame 54 that is supported by a load cell 53, and is driven by means of a motor 57. The load cell 53 is set to a given load so as to permit the metering per unit weight for the scale conveyor 51. During the time which the scale conveyor is driven at a low speed, if the weight of the crushed rubber blocks delivered from the delivery conveyor 52 onto the conveyor 51 reaches a set value of the aforesaid load cell, then the motor 58 for the delivery conveyor 52 will be interrupted for a given period of time. At this time, the scale conveyor 51 will continue to be driven at a low speed, or will transfer a given amount of rubber granules metered onto the storage conveyor 66 which stands still, with the speed of the conveyor 51 being increased. When a unit weight of rubber granules 16 have been completely transferred on to the succeeding conveyor and the given period of time passed, the motor 58 for the delivery conveyor 52 will again be actuated according to the passing of the given period of time. Meanwhile, during the time which the rubber granules are being fed from the delivery conveyor 52 on to the scale conveyor 51, the scale conveyor 51 may be maintained out of driven condition.

For feeding a given weight of rubber granules on to the scale conveyor 51, there may be used a metering hopper (not shown) whose operation and control may be effected in the similar manner to those of the delivery conveyor 52. In addition, the rubber granules 16 may be transferred on to the storage conveyor 66 by moving same a given distance at a speed lower than that of the conveyor 51 during the transporting operation of the conveyor 51. In this respect, the height of the rubber granules thus being transported may be lower than that of the previous case but in with uniform thickness.

Turning again back to FIG. 1, a third conveyor system is generally shown at 60. As shown, the third conveyor system 60 includes five conveyors 61 to 65. These conveyors 61 to 65 are storage conveyors which store in a given amount per kind a plurality of kinds of rubber granules which are being transported from the crusher 12. With the embodiment shown in FIG. 1, wherein there are provided a plurality of storage conveyors, there is provided a fourth conveyor system for transferring on to the storage conveyors 61 to 65 the rubber granules metered by the scale conveyor 51, selectively per kind.

The fourth conveyor system 70 includes an extensible conveyor which is adapted to transport a given amount of rubber granules, which have been metered by the scale conveyor 51, on to the conveyors 61 to 65, selectively per kind. The respective storage conveyors 61 to 65 receive a given amount of rubber granules through a chute 72 from the extensible conveyor 71, after which the storage conveyors 61 to 65 transport rubber granules a given distance intermittently. For this purpose, for instance, there is provided a pulse generator (not shown) cooperative with the extensible conveyor 71, with the pulse number being set beforehand for the distance from the scale conveyor 51 to the respective storage conveyors 61 to 65, so that the storage conveyors are moved a given distance in response to the signal issued when the pulse number reaches a set value, and thereafter stopped. By repeating such an intermittent operation of the conveyors, rubber granules may be stored in a given amount per a given space on the surfaces of the conveyors 61 to 65, thus presenting a layer of rubber granules of a substantially uniform thickness. In this manner, various kinds and properties of rubber granules may be stored on the respective storage conveyors 61 to 65.

As has been described earlier, FIG. 3 shows another embodiment of the third conveyor system 60. It may be readily understood for those skilled in the art that the storage conveyor 66 of the third conveyor system of FIG. 3 may dispense with the aforesaid extensible conveyor, because of a single storage conveyor. The storage conveyor 66 is a belt conveyor which is driven by means of a motor 67. The conveyor 66 is encompassed with opposite side plates 68, 68 and top plate 69. As in the case with the aforesaid plurality of storage conveyors 61 to 65, when the rubber granules 16 metered by the scale conveyor have been completely loaded on the storage conveyor, the drive motor 67 causes the storage conveyor to advance a given distance. The side plate 68 serves so as to increase the amount of rubber granules loaded per unit area on the storage conveyor 66 as well as to control the loaded rubber granules so as to maintain a given height in the width direction of the storage conveyor, as well. In addition, the top plate 69 serves to maintain constant the thickness of the rubber granules 16 to be loaded on the storage conveyor 66 as well as to provide a desired height of the pile of the rubber granules 16 by suitably selecting the distance of the intermittent movement of the storage conveyor. The figure shows the condition where metering has been completed five times and the fourth rubber granules metered has been loaded on the storage conveyor 66, with the fifth rubber granules metered being loaded thereon. By proceeding with such metering and loading operations, the rubber granules will be uniformly loaded on the storage conveyor 66, while the total weight of rubber granules may be readily obtained from calculation of the metering cycles.

In this manner, the rubber granules stored on the storage conveyor may be transported to a metering device, as shown in FIG. 1. The metering device 80 includes an electromagnetic feeder 81 placed at the exit of the storage conveyor, and a metering hopper 82 adapted to admit the rubber granules being fed from the feeder 81. The metering hopper 82 is equipped with a control means (not shown) adapted to interrupt the operation of the storage conveyor and electromagnetic feeder, when the amount of rubber granules being transferred from the storage conveyor reaches a desired amount.

In case rubber granules stored on the respective storage conveyors 61 to 65 are directly charged into the metering hopper 82, a great amount of rubber granules instantaneously drop into the metering hopper, thus resulting in difficulty in feeding a given amount of rubber granules into the metering hopper. To cope with this, there is provided a constant feed means such as an electromagnetic feeder, between the storage conveyor and the metering hopper for controlling the amount of rubber granules being fed, thereby enhancing the improvement in the metering accuracy. In addition, the electromagnetic feeder 81 compensates for the compaction of rubber granules dropping from the storage conveyors 61 to 65 into the metering hopper 82, thereby further improving the metering accuracy.

The rubber granules are admitted from one or more storage conveyors 61 to 65 into the respective metering hopper 82, with the aid of the electromagnetic feeder 81, to be metered to a desired amount, after which the rubber granules are caused to drop from the respective hoppers onto the conveyor 83 located thereunder. The rubber granules on the conveyor 83 are fed to a hopper 86 of a kneader 85 having a plunger 84, and stored therein. The rubber granules stored in the hopper 86 are charged into the kneader 85 at a time, when so required for the kneader 85, and kneaded together with various kinds of ingredients.

It has been customary that several kinds (one to five kinds) of rubber granules are charged into the kneader 85 at a time, so that there should be provided a plurality rows of storage conveyors 61 to 65. Thus, the same kind of rubber granules are stored on a specific storage conveyor. It follows then that the rubber blocks are charged into the crusher per kind, while the chute 72 of the extensible conveyor 71 is located relative to a specific storage conveyors 61 to 65, as per kind of the starting rubber materials.

As has been described earlier, the starting rubber blocks are transported to the crusher 12 by means of conveyor groups 21, 22. Particularly, in the case of the starting rubber blocks of a large size, such as natural rubber blocks, a pallet (not shown), on which are carried natural rubber blocks, is turned over by means of a transporting vehicle, such as a forth lift, over the feed-in conveyor 25, so that the natural rubber blocks 15 are transferred on to the conveyor 25. The natural rubber blocks transferred on to the conveyor 25 are then transported intact forwardly, i.e., towards the arranging conveyor 26. In this respect, in case a plurality of natural rubber blocks are not laid one on top of another, then the rubber blocks 15 pass under the scraping roll 42 intact, while in case the rubber blocks are overlaid one on top of another, then the rubber blocks are scraped rearwardly by means of the scraping roll 42 and then fed in the form of a single layer onto the arranging conveyor 26.

Since the side conveyors 28, 29 are convergent in the advancing direction on the arranging conveyor 26, with its minimum spacing being substantially equal to the maximum size of a single natural rubber block, the natural rubber blocks received among the three conveyors 26, 28, 29 are rotated, arranged and transported one by one to the subsequent conveyor 27, with the aid of roller 34 of the arranging conveyor 26 as well as the belts 40, 41 of the side conveyors 28, 29.

The natural rubber blocks which are being transported by the delivery conveyor 27 are subjected to the checking due to the metal detector 46 and then charged into the crusher located adjacent to the conveyor 27.

The unvulcanized rubber blocks which have been charged into the crusher 12 are crushed into granules therein. The granules thus prepared are then delivered by means of the delivery conveyor 12 from the crusher 12 to the scale conveyor 51. A given amount of rubber granules thus metered on the scale conveyor 51 are tansported according to their kinds to the storage conveyors 61 to 65 by way of the extensible conveyor 71, and then stored on the aforesaid storage conveyors. The total weight of the rubber granules may be known by the metering cycles of the scale conveyor 51. When the total weight of such rubber granules on the storage conveyor reaches a desired amount, another kind of rubber granules are commenced to be stored on another storage conveyor according to the aforesaid steps.

A given amount of rubber granules stored on the storage conveyors 61 to 65 are then metered to a desired amount by means of the electromagnetic feeder 81 and metering hopper 82, before being charged into the kneader 85. The desired amount of rubber granules thus metered are transferred from the metering hopper 82 by way of the conveyor 83 into the kneader 85.

Hitherto, for feeding one by one the starting rubber blocks to the subsequent step, vacuum suction has been applied to pick up the rubber blocks from a pallet, on which the rubber blocks are loaded, or a rod having a spear-like sharp tip has been used to piercing same through a rubber block. In contrast thereto, the present invention dispenses with man powers required for such purposes and permits the automation for arranging and transportation of the rubber blocks, thus allowing the sequential charging of rubber blocks into a crusher after a certain lapse of time. This improves the usage data of a crusher and facilitates the succeeding automatic handling of the rubber blocks after the crushing step.

In addition, the storage conveyor according to the present invention permits the storage of the rubber granules continuously in uniform thickness, while enabling a great amount of rubber granules in a relatively small space. Furthermore, rubber granules may be metered for an amount required for the subsequent kneading, before the proceeding rubber granules are metered, charged and batched out from the kneader, and then fed into a hopper of the kneader, followed by storage in the hopper. In addition, the succeeding rubber granules may be charged into a kneader, immediately after the preceding rubber granules have been batched out, thereby increasing the processing amount of the rubber granules, per hour, by means of a kneader.

As is apparent from the foregoing description, the present invention permits the automated feeding of the starting rubber granules to a kneader in an accurately metered amount, with the accompanying positive operations and improved efficiency of operations.

What is claimed is:

1. A method for automatically and successively feeding a desired amount of several selected kinds of rubber granules into a kneader, comprising the steps of:
    transporting unvulcanized rubber blocks to a crusher;
    crushing the rubber blocks in the crusher to produce rubber granules;
    metering a given amount of rubber granules thus prepared;
    conducting the above three steps for each selected kind of rubber to be fed into the kneader;
    storing the several kinds of rubber granules thus metered separately on a plurality of conveyors in said given amount;
    further metering a prescribed amount of each selected kind of stored rubber granules; and
    feeding said prescribed amount of each selected kind of rubber granules to the kneader.

2. An apparatus for automatically and successively feeding a desired amount of several selected kinds of rubber granules to a kneader, comprising:
    a crusher for crushing unvulcanized rubber blocks into granules;
    a first conveyor system for feeding said rubber blocks into said crusher;
    a second conveyor system including a scale conveyor and a conveyor for transporting rubber granules from said crusher onto the scale conveyor which meters rubber granules per unit weight from said crusher;
    a plurality of conveyors adapted to separately store the selected kinds of rubber granules, each storage conveyor having means for intermittently moving it forward for the purpose of storing a number of the unit weights of rubber granules which have been metered by said scale conveyor;
    metering means located at the discharge end of each storage conveyor and adapted to meter a prescribed amount of the selected kinds of rubber granules to be fed into said kneader;
    feeding means for feeding to said kneader the prescribed amount of each selected kind of rubber granules.

3. An apparatus as set forth in claim 2, wherein each metering means consists of a metering hopper and a feeder for feeding rubber granules from said storage conveyor into said metering hopper.

4. An apparatus as set forth in claim 2, wherein said scale conveyor has a load cell for metering rubber granules, and wherein said transporting conveyor is operated until the weight of the rubber granules delivered from said transporting conveyor onto the scale conveyor reaches a set vaue of the load cell.

5. An apparatus as set forth in claim 2, wherein said first conveyor system is provided with a slat conveyor for arranging said unvulcanized rubber blocks of a non-fixed shape, wherein the transporting element of said slat conveyor consists of a plurality of rollers having rotary shafts directed in the transporting direction and a pair of side conveyors placed at an angle to said transporting direction, and wherein the transporting element of said pair of side conveyors are all driven in the same direction.

6. An apparatus as set forth in claim 5, wherein the transporting elements of said pair of side conveyors are equipped with a plurality of pawl-shaped projections on their surfaces.

7. An apparatus as set forth in claim 5, wherein said first conveyor system is equipped with a roll which is placed on said arranging conveyor but in the transverse direction thereof, said roll having a plurality of pawl-shaped projections on its surface.

8. An apparatus as set forth in claim 5, wherein said first conveyor system includes a metal detecting means located in the transporting path leading from said arranging conveyor to said crusher.

9. An apparatus for automatically and successively feeding a desired amount of rubber granules into a kneader, comprising:
    a crusher for crushing unvulcanized rubber blocks of non-fixed shape into granules;
    a conveyor system for charging said rubber blocks into said crusher, said conveyor system being provided with a slat conveyor having a plurality of rollers equipped with rotary shafts which are directed in the transporting direction, a pair of side conveyors having transporting elements which are located at an angle to said transporting direction and having a plurality of pawl-shaped projections on their surfaces, and a roll located transversely of said slat conveyor and having pawl-shaped projections on its peripheral surface;
    a gate-shaped metal detector located on the transporting path leading from said slat conveyor to said crusher;
    a scale conveyor having a load cell for metering a given amount of rubber granules which have been prepared by said crusher;
    feeding means for feeding rubber granules from said crusher to said scale conveyor, said feeding means being adapted to interrupt the feed of rubber granules, when a given amount of rubber granules have been metered on said scale conveyor;
    a plurality of storage conveyors receiving a given amount of rubber granules metered by said scale conveyor and causing said rubber granules to intermittently move forward for storage of a number of unit weights thereof;
    an extensible conveyor transporting to said plurality of storage conveyor a given amount of a selected kind of rubber granules that has been metered;
    metering means located at the exists of said respective storage conveyors and comprised of a metering hopper and a feeder for feeding rubber granules from said storage conveyor into said metering hopper so that the metering hopper accurately meters a desired amount of rubber granules to be fed into said kneader; and
    a feeding conveyor feeding a desired amount of rubber granules, which have been metered by said metering means, to the kneader for being kneaded together with various kinds of ingredients therein.

* * * * *